United States Patent [19]
Jackson

[11] 3,771,297
[45] Nov. 13, 1973

[54] SWATHER DEVICE

[76] Inventor: Erval D. Jackson, Edgeley, N. Dak.

[22] Filed: May 26, 1972

[21] Appl. No.: 257,189

[52] U.S. Cl. .............................................. 56/15.2
[51] Int. Cl. ............................................ A01d 55/28
[58] Field of Search.................. 56/10.7, 13.5, 13.7, 56/13.8, 14.3, 14.4, 14.5, 14.6, 14.9, 15.2, 15.5, 208, 209

[56] References Cited
UNITED STATES PATENTS

| 2,750,204 | 6/1956 | Ohrmann | 56/209 |
| 3,151,429 | 10/1964 | Dyrdahl | 56/15.9 |
| 3,613,336 | 10/1971 | Smith | 56/15.2 |

Primary Examiner—Antonio F. Guida
Attorney—Robert E. Kleve

[57] ABSTRACT

The invention comprises a self propelled swather. The swather has a tractor with a hydraulic operated parallel linkage mechanism mounted to the front thereof. A swather frame is pivotally mounted to the front of the parallel linkage to pivot from side to side about the pivotal mounting. Hydraulically operated leveling wheels are mounted to the outer ends of the swather frame and may be raised and lowered to level the swather frame at the outer ends relative to the ground about the pivotal mounting. The swather frame also has dual cutting blades which reciprocate toward and away from one and another from the cutting operation of the swather.

4 Claims, 10 Drawing Figures

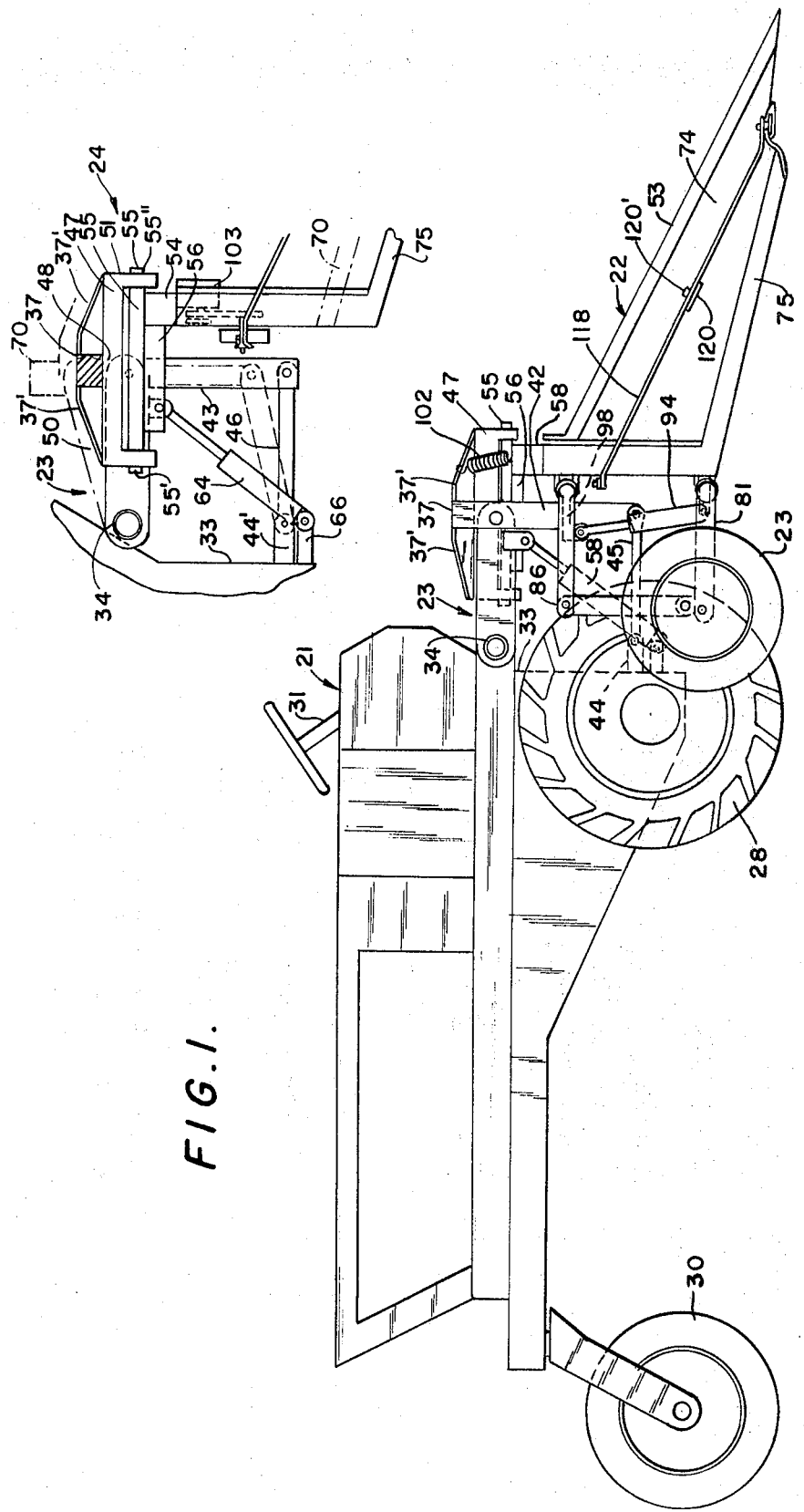

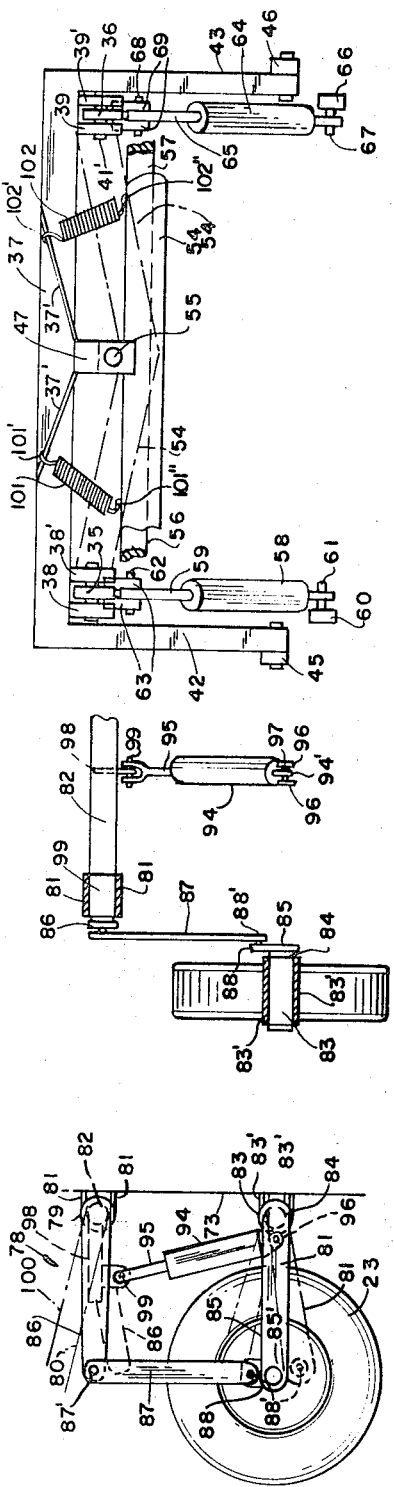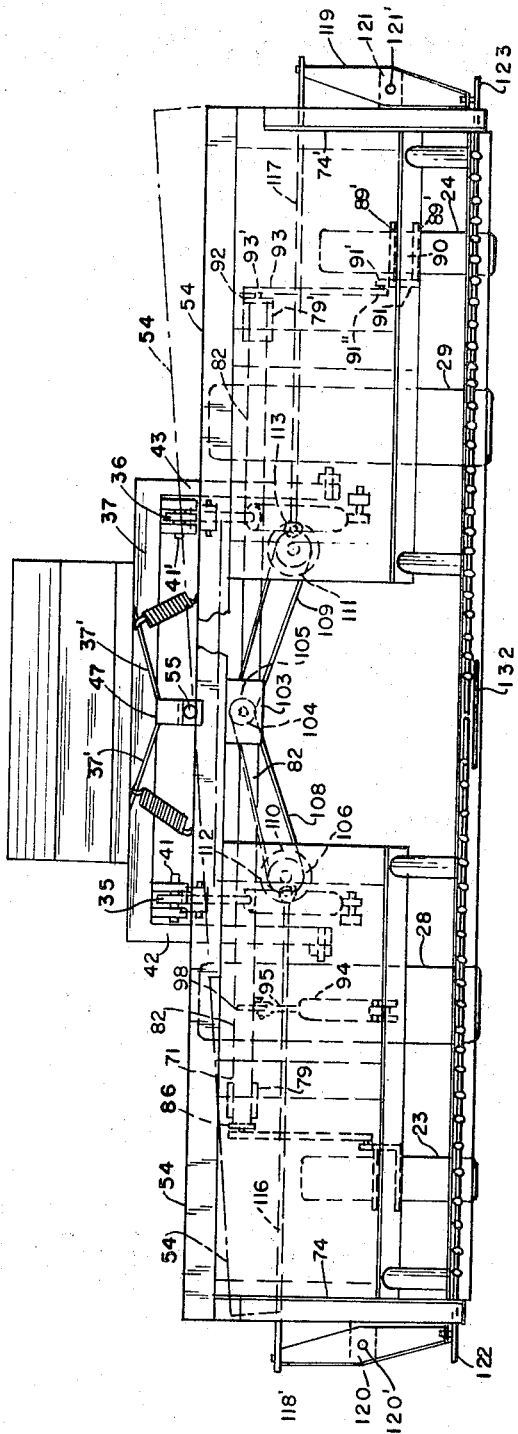

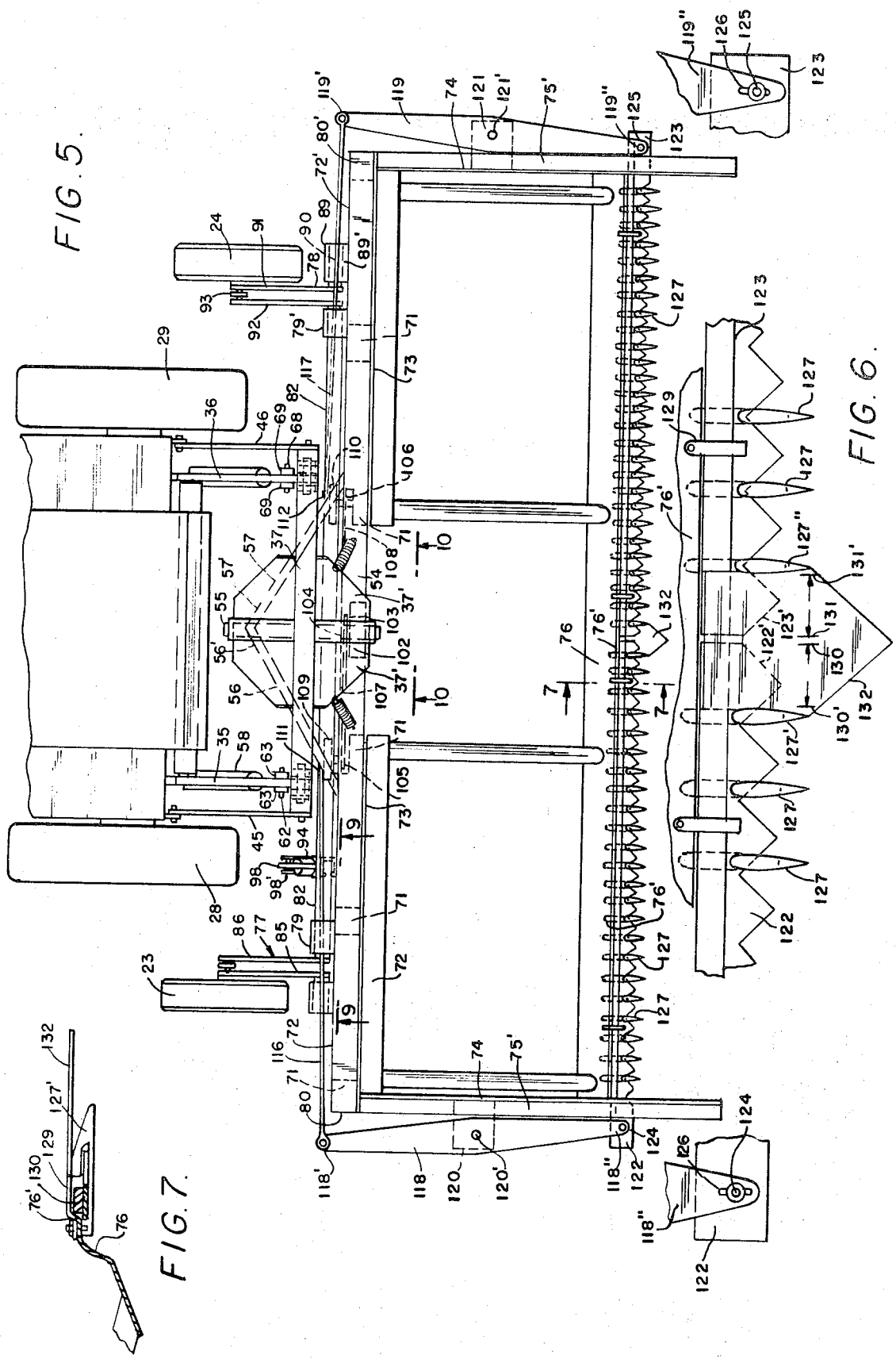

SWATHER DEVICE

This invention relates to farm harvesting equipment, more particularly, the invention relates to self propelled swathers.

It is an object of the invention to provide a novel self propelled swather having a tractor with a parallel linkage mounted to the front of the tractor and a pivotal connection between the parallel linkage or a swather frame whereby the swather frame may swing about the pivotal mounting from side to side laterally at the line of travel of the tractor with hydraulic adjustment wheels on the swather frame.

It is another object of the invention to provide a novel swather frame which will adjust to the level of the ground relative to the position of the tractor propelling the swather frame.

It is another object of the invention to provide a novel self propelled swather device having a tractor with a swather frame which may be adjusted relative to the tractor by being pivoted from side to side and has adjustable wheels at the outer ends of the swather frame.

It is another object of the invention to provide a novel self propelled swather which provides an improved cutting operation.

It is another object of the invention to provide a novel adjustable harvester reel or swather frame which has two cutting knives which reciprocate toward and away from one another for easier cutting.

Further objects and advantages of the invention will become apparent as the description proceeds and when taken in conjunction with the accompanying drawings wherein:

FIG. 1 is a side elevational view of the self propelled swather invention.

FIG. 2 is an enlarged fragmentary view of the raising and lowering mechanism and side to side swing mechanism for the swather.

FIG. 3 is a front elevational view of the self propelled swather invention.

FIG. 5 is a fragmentary top view of the swather invention illustrating the swather with a fragmentary showing of the tractor.

FIG. 6 is an enlarged fragmentary showing of the dual cutter bars or cutters knives and their operative connection.

FIG. 7 is a cross-sectional view taken along line 7—7 of FIG. 5.

FIG. 8 is an enlarged fragmentary showing of one of the leveling or adjustment wheels for the swather or harvesting frame.

FIG. 9 is a cross-sectional view taken along line 9—9 of FIG. 5.

FIG. 10 is a cross-sectional view taken along line 10—10 of FIG. 5.

Figure 4:
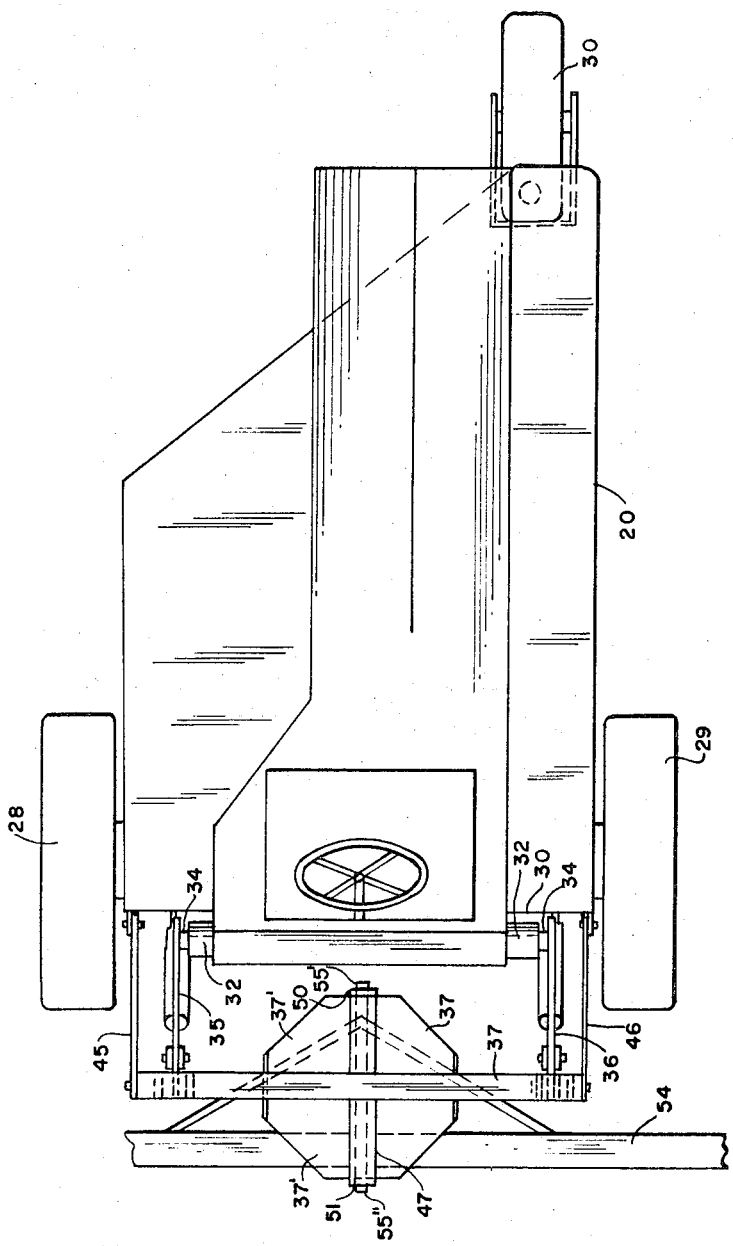
FIG. 4 is a fragmentary top view of the swather invention illustrating the tractor and the central portions of the swather.

Briefly stated, the invention comprises a self propelled swather device having a tractor with a hydraulic parallel linkage mechanism mounted to the front thereof. A pivotal connection is mounted to the front of the parallel linkage to pivotally connect a swather frame to the parallel linkage, whereby the hydraulic parallel linkage may raise and lower the swather frame, and whereby the swather frame may pivot from side to side about the pivotal mounting relative to the parallel linkage and tractor, hydraulic leveling wheels are mounted to the outer ends of the swather frame. Whereby the swather frame may be leveled relative to the ground about the pivotal mounting independantly of the tractor for more even cutting by the swather.

The invention further includes dual cutting knives mounted to the front of the swather which oscillates toward and away from one another for the cutter operation of the swather.

Referring more particularly to the drawings in FIG. 1, the self propelled swather or harvester reel invention 20 is illustrated as having a tractor 21 with a swather 22 mounted to the front thereof. A parallel linkage 23 is mounted to the front of the tractor and a pivotal connection 24 connects the parallel linkage 23 to the swather frame 25. A pair of adjustable wheels 26 and 27 are mounted to the outer ends of the swather frame.

The tractor 21 has two front drive wheels 28 and 29 and a pivotal mounted rear wheel 30 which is turned by a steering wheel 31 by conventional mechanism. The tractor has a conventional motor for powering the drive wheels 28 and 29.

The parallel linkage mechanism 23 has a cylindrical tube 32 which is fixed to the front 33 of the tractor. A cylindrical rod 34 is rotatably mounted in the tube 32. A pair of lever arms 35 and 36 have their one ends 35' and 36' fixed to the rod 34 and project forward. An inverted U-shaped frame 37 has a pair of lugs 38 and 38' and 39 and 39' at the apex 40 of the U-shaped frame. A bolt 41 passes through bores in the lugs 38 and 38' and through a bore in the forward end 35'' of the arm 35 to pivotally connect the arm 35 to the U-frame. A bolt 41' passes through bores in lugs 39 and 39' and through a bore in the forward end 36'' of the arm 36 to pivotally connect the arm 36 to the U-frame. The legs 42 and 43 of the U-frame 37 project vertically downward. A pair of lugs 44 and 44' are fixed to the front 33 of the tractor spaced below the tube 32. A pair of lever arms 45 and 46 have their one ends pivotally connected to lugs 44 and 44', respectively by bolts which pass through the bores over each of the lever arms 45 and 46 and through bores in the lugs 44 and 44', respectively. The pair of lever arms 45 and 46 have their other ends pivotally connected to the lower end of the legs 42 and 43 of the U-frame by bolts passing through bores in the lower ends of the legs 42 and 43, respectively, and through bores in the arms 45 and 46, respectively.

An inverted U-shaped member or cradle 47 is fixed to the lateral across the underside 48 of the apex 40 of the U-frame 37 with the apex 49 of the cradle 47 fixed to the underside 48 of the U-frame. The legs 50 and 51 of the U-shaped member 47 project vertically downward. The swather 22 has a swather frame 53 with a rear horizontal upper beam 54. A pivot rod 55 is fixed laterally across the beam 54. A pair of steel braces 56 and 57 have their one ends 56' and 57' welded to the beam 54 and project rearward and converge toward one end with the other end 56'' and 57'' welded together and also welded to the underside of the pivot rod 55 to thereby fix the pivot rod 55 to the beam 54 of the swather frame adjacent both ends of the rod 55. The outer ends 55' and 55'' are pivotally mounted in the legs 50 and 51, respectively of the U-shaped frame 47 to thereby pivotally connect the swather frame to the cradle 47 about a horizontal axis extending forwardly along the line of travel of the swather.

A hydraulic cylinder 58 has a piston 59 with the rear end pivotally mounted to a lug 60 by a bolt 61. The lug 60 is fixed to the front of the tractor. The outer end of the piston 59 is pivotally mounted to the lever arm 35 by a bolt 62 which passes through bores in a pair of plates 63, which plates are fixed to the arm 35, and which passes through a bore in the outer end of the piston rod 59.

The hydraulic cylinder 64 has a piston 65 with the rear end of the piston pivotally mounted in a leg 66 by a bolt 67 and a leg is fixed to the front of the tractor. The outer end of the piston 65 is pivotally mounted to a lever arm 36 by a bolt 68 which passes through a bore in the outer end of the piston rod and through bores in a pair of plates 69 and the plates 69 are fixed to the lever arm 36.

The hydraulic cylinders 58 and 64 act to raise and lower the main parallel linkage forward by the arms 35 and 36, the U-shaped member 37, and arms 45 and 46 to raise and lower the U-shaped member 37, cradle 47 and swather frame 25 in apath which is parallel to the tractor as shown in phantom lines in FIG. 1, and designated by numeral 70

The swather frame 53 has six vertical steel beams 71 which project vertically upward with their upper ends welded to the horizontal beam 54. A plate 72 is welded between the outer two beams on each side of the swather frame. A metal back wall panel 73 is fixed along the front of the beams 69 to form the back wall of the frame. A pair of metal side panels 74 and 74' project forward and are fixed to a reinforcement forwardly projecting beams 75, which beams are fixed to the back wall 70. A conventional plate 76 extends along the front of the swather frame and connects the forward lower ends of the beams 75 together. Additional reinforcement beams are provided to provide a swather frame.

The leveling wheels 23 and 24 are raised and lowered by dual parallel linkages 77 and 78. A pair of horizontal tubes 79 and 79' are positioned adjacent each end 80 and 80' of the swather frame. The horizontal tubes 79 and 79', respectively, above legs 81 fixed thereto which project rearwardly and which lugs are fixed to the back panels 72 and 72' of the swather frame. A cylindrical rod 82 is rotatably mounted in the horizontal tubes 79 and 79'.

The parallel linkage mechanism for leveling wheel 23 is positioned adjacent the one end of the ord 82. A tube 83 has lugs 83' fixed thereto which project rearwardly and which lugs are fixed to the back of panel 72. A rod 84 is rotatably mounted in the tube 83. An arm 85 is fixed to the outer end of rod 84 and projects rearwardly. The wheel 23 is rotatably mounted to the outer end of the arm 85 at pivot point 85'. An arm 86 is fixed rearwardly. An elongated plate 87 has one end pivotally mounted to arm 86 at pivot point 87' and the other end pivotally mounted to leg 88 at pivot point 88' which leg 88 is fixed to arm 85 to thereby form a parallel linkage for leveling wheel 23 whereby the rotation of the cylindrical control rod 82 will act to raise and lower the parallel linkage to thereby raise and lower the leveling wheel 23.

The parallel linkage mechanism 78 for the other leveling wheel 24 is positioned adjacent the other end of the cylindrical rod 82 and operates in the same manner as mechanism 77. A tube 89 has legs 89' fixed thereto which project rearwardly and are fixed to the back of the panel 72'. A rod 90 is rotatably mounted in the tube 89. An arm 91 is fixed to the outer end of rod 90 and projects rearwardly. The wheel 24 is rotatably mounted to the arm 91 at pivot point 91'. An arm 92 is fixed to the other outer end of control rod 82 and projects rearwardly on elongated plate 93 has one end pivotally mounted to arm 92 at pivot point 93' and the other end pivotally mounted to lug 91' at pivot point 91'' which lug 91' is fixed to arm 91 to thereby form a parallel linkage 78 for leveling wheel 24. The parallel linkages 77 and 78 are identical to one another except being in opposed relation. The rotation of the central rod 82 across the back of the swather frame will raise and lower the parallel linkage 77 and 78 simultaneously to thereby raise and lower the leveling wheels 23 and 24 simultaneously.

A hydraulic cylinder 94 is positioned at the back of the swather frame. The cylinder 94 has a piston 95 which is hydraulically telescoped in and out of the cylinder 94. A pair of lugs 96 and 96' are fixed to the back of panel 72. The cylinder 94 has a lug 94' fixed to its rearward end and a pin 97 passed through lugs 96 and 96' and 94 to pivotally connect the cylinder to the swather frame. An arm 98 has one end fixed to the control rod 82 and projects rearwardly with its outer end pivotally connected to the piston 95 at pivot point 98' whereby the actuation of the cylinder 94 telescope and retracts the piston 95 and the piston pivots the arm 98, and the pivoting of the arm 98 pivots the control rod 82 which pivots the linkages 77 and 78 upward and downward simultaneously to thereby pivot the wheels 23 and 24 upward and downwardly simultaneously as shown in phantom lines 100 in FIG. 8.

A pair of coil springs 101 and 102 are mounted on each side of the parallel connection with their one ends 101' and 102', respectively, attached to the flanges 37' on each side, respectively, of the U-channel 47. The flanges 37' are fixed between the members 37 and 47 to rigidly connect them together. The other ends of the coil springs 101 and 102 are attached to the beam 54 of the swather frame at locations 101'' and 102'' and act to urge the swather frame, through their connection with the beam 54 of the swather frame into parallel alignment with the parallel linkage U-channel member 37 about its pivotal mounting 55, when the swather frame is lifted off the ground by the main parallel linkage to transport the swather.

A hydraulic motor 103 is fixed beneath the beam 54 of the swather frame. A pair of drive gears 104 and 105 are fixed to the output shaft 103' of hydraulic motor. A second pair of drive gears 106 and 107 are rotatably mounted to the back of the swather frame in recesses in the frame. An endless chain 108 transmits drive from gear 104 to gear 106. A second endless chain 109 transmits drive from gear 105 to gear 107. A disc member 110 is fixed coaxially to gear 106 and a disc member 111 is fixed coaxially to gear 107. The gear 106 and disc member 110 are rotatably mounted to the swather frame at axis 112. Gear 107 and disc member 111 are rotatably mounted to the swather frame at axis 113. The disc member 110 and 111 have each projecting pins 114 and 115, respectively, mounted off center to the rotational axes of the discs 109 and 110. Arms 116 and 117 are pivotally mounted to the pins 114 and 115. The activation of the hydraulic motor 103 drives gears 104 and 105, respectively, which drive endless chains 108 and 109, respectively, which rotates disc 110 and 111, respectively, through gears 106 and 107, respectively. The rotation of the discs 110 and 111 acts to reciprocate the arms 116 and 117 back and forth along their loingitudinal axes.

The outer ends of the arms 116 and 117 are pivotally mounted to arms 118 and 119, respectively, at their one ends 118' and 119'. The arms 118 and 119 are pivotally mounted centrally of their length to the opposing sides of the swather frame at pivot points 120' and 121' to flanges 120 and 121 which flanges are fixed to the sides 74 and 74', respectively, of the frame. Th other ends 118'' and 119'' are pivotally mounted to the outer ends of the pair of cutter knives or cutter bars 122 and 123 by means of bolts 124 and 125 which pass through bores 126 in the outer ends of the cutter bars 122 and 123. The bores 126 are slightly oversized so that as the arms 118 and 119 pivot back and forth they may slide the cutter bar longitudinally back and forth with the slightly oversizing of the bores 126 compensating for the slight curvature of the movement of the arms 114 and 115 at their outer ends.

Conventional teeth 127 are fixed at their rearward end 128 to the front edge 76' of the swather frame. The cutter bars or cutter knives 122 and 123 will each reciprocate back and forward simultaneously toward and away from one another sliding along the slots in the teeth. A plurality of conventional U-brackets 129, fixed at their one end to the panel 76 loop over ridges 130 on the cutter bars 122 and 127 to hold the cutter bars in alignment as they slide along the teeth. The length of travel of the cutter bars is approximately 3 inches. Their inner ends 122' and 123' when moving toward one another stop approximately 1 inch apart at the phantom lines designated by numerals 130 and 131. When moving apart from one another they stop short of sliding out of the conventional teeth 127' and 127'' at the phantom lines designated by numerals 130' and 131'. The center tooth of the swather frame is removed. A triangular plate 132 is welded to the teeth 127' and 127'' on each side of the plate 132 and projects forward.

The triangular plate 132 acts to divert the oncoming grain in this area past the teeth 127' and 127'' on each side for cutting by the cutter bars 122 and 123, while the rest of the oncoming grain along the front of the cutter bars is cut in their normal manner.

OPERATION

The swather invention operates as follows:

The swather device 20 will have a conventional harvester reel, not shown, which will be mounted in the swather frame in a conventional manner to reel the oncoming grain against the cutter bars 122 and 123 in a conventional manner. Also, conventional conveyor belt canvases will be mounted in the bottom of the swather frame, not shown, to convey or move the grain, immediately after being cut, toward the center of the swather frame, where the cut grain will drop to the ground through the opening 133 and form a windrow along the field as the swather invention moves forward powered by the tractor.

The operator, immediately prior to the swathing or grain cutting or the like operation will lower the leveling wheels 23 and 24 by hydraulically retracting the piston 95 into the cylinder 94 which pivots the arm 98 counterclockwise downward when viewed from FIG. 1, which pivots the parallel linkages and leveling wheels downward relative to the swather frame. The leveling wheels 23 and 24 will be pivoted downward until they project below the swather frame the amount desired to raise the swather frame above the ground.

Thereupon, the operator will lower the swather frame until the leveling wheels 23 and 24 engage the ground, by hydraulically retracting the pistons 59 and 68 into the hydraulic cylinders 57 and 64 which lowers the swather frame downward by the downward pivoting of the main parallel linkage.

When the leveling wheels 23 and 24 engage the ground, their positioning relative to the swather frame will space the swather frame the desired height off the ground for the swather to swath to cut the grain stalks. At this point the hydraulic cylinders 57 and 64 will be placed in a free floating position by conventional hydraulic control means which means the hydraulic fluid may flow freely in and out of the cylinders on either side of the pistons thus enabling the main parallel linkage by the arms 35, 36, 45, and 46 to pivot freely up and downward with the swather frame relative to the tractor and the main parallel linkage will be free of any material drag or interference by the hydraulic cylinders 57 and 64.

The free floating of the cylinders 57 and 64 and their pistons enables the tractor and swather to travel upon the ground with the swather frame free to pivot about the main parallel linkage relative to the tractor as the tractor and swather frame move forward, with the leveling wheels maintaining the swather at the desired height. Thus the swather can operate on irregular terrain and adjust to the terrain independently of the tractor within the limits of the pivotal mounting 55 and the free movement of the main parallel linkage. The pivotal mounting 55 enables the swather frame to pivot to an angle of a full 30° F. in either direction about the pivot point 55 relative to the main parallel linkage and tractor from its position shown in solid lines in FIG. 7, and in the manner illustrated in phantom lines 133 and 134, to adjust to the swather frame to irregularities in the terrain.

For later transporting the hydraulic cylinders will be reactivated out of their free floating position and the hydraulic cylinder will lift the main parallel linkage which lifts the swather frame and leveling wheels off the ground to simulate height for transporting.

The operator will by powering the tractor move the swather through the grain fields cutting the grain stalks and windrowing them. The leveling wheels will act to keep the swather frame more even with the overall terrain under the frame even through the tractor may not be level with the overall terrain under the swather frame as the leveling wheels enable the swather frame, as the leveling wheels enable the swather frame to pivot about its pivotal mounting 24 relative to the tractor and main parallel linkage, so as to maintain the tractor frame level with the ground for more even uniform cutting of the grain stalks.

When the swather frame is fixed as to side to side movement in relation to the tractor, a lateral drop of a few inches of one front tractor wheel into a rut, with respect to the other front tractor wheel so as to place the tractor at an angle with respect to the overall terrain creates much more of a drop at the corresponding outer end of the swather frame.

The leveling wheels and pivotal mounting act to maintain the swather frame and act to prevent one end of the swather frame from digging into the ground and possibly the other end of the swather from cutting off the grain stalks too near the head of the grain.

In the invention illustrated, the leveling wheels are located near the outer ends of the swather frame. Although the invention is illustrated with a swather frame which is in reality approximately 14 feet in length, the invention has even greater utility with the larger swather frames, such as those swather frames which are approximately 18 feet in length.

In the eighteen foot swathers the leveling wheels 93 and 94 will be spaced and mounted in the same manner to the back of the swather frame, approximately four feet further apart from one another, so that the distance from the leveling wheels to the outer ends of the swather frame will remain the same as illustrated, or the leveling wheels may be mounted even closer to or at the very remote ends of the swather frame.

Thus, by the leveling wheels, the swather frame will pivot to position the swather frame more level with the terrain under the swather frame, and independently within limits of the tractor wheels.

Also, the dual cutter bars 122 and 123 provide easier cutting of the grain and the like, since the blades are not as long and will move easier in their reciprocating action and will have less end strain on them as they are moved back and forth, than when a single blade is used for the full length of the swather frame.

It will be obvious that various changes and departures may be made to the invention without departing from the spirit thereof and accordingly it is not intended that the invention be limited to that specifically described in the specification or as illustrated in the drawing but only as set forth in the appended claims wherein:

What is claimed is:

1. A swather device having a tractor, a swather, frame, raising and lowering means mounted to the front of said tractor for raising and lowering said swather frame relative to the tractor, pivotal mounting means pivotally connecting said raising and lowering means to said swather frame whereby said swather frame may be pivoted from one side of the tractor to the other side of the tractor about a forwardly extending axis, a leveling wheel mounted adjacent each outer end of the swather frame, means for raising and lowering said leveling wheels relative to the frame whereby the ends of the swather frame may be adjusted relative to the ground about said pivotal mounting by raising or lowering said leveling wheels.

2. A swather device according to claim 1 wherein said raising and lowering mechanism mounted to the front of said tractor comprises a parallel linkage mechanism and is hydraulically actuated.

3. A swather device according to claim 1 wherein said raising and lowering mechanism for said leveling wheels comprises parallel linkages and are hydraulically actuated.

4. A swather device according to claim 1 wherein said swather includes a pair of elongated cutter bars mounted in end to end relation along the front of the swather frame and which reciprocates back and forth longitudinally of their length toward and away from one another to perform the cutting operation for the swather.

* * * * *